UNITED STATES PATENT OFFICE.

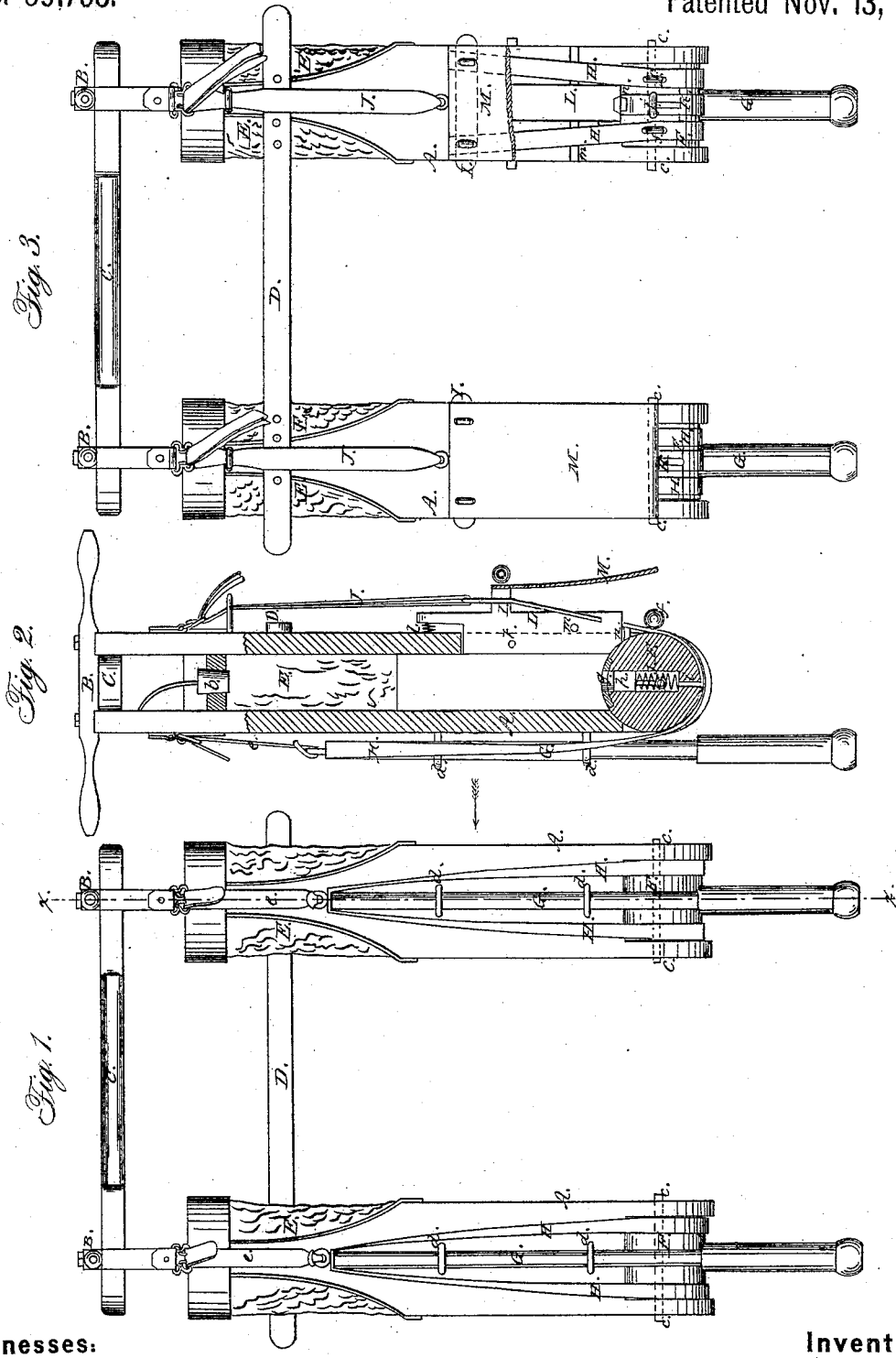

ROBERT M. YORKS, OF SCHOOLCRAFT, MICHIGAN.

IMPROVEMENT IN CORN-PLANTERS.

Specification forming part of Letters Patent No. 59,703, dated November 13, 1866.

*To all whom it may concern:*

Be it known that I, ROBERT M. YORKS, of Schoolcraft, in the county of Kalamazoo and State of Michigan, have invented a new and Improved Corn-Planter; and I do hereby declare that the following is a full, clear, and exact description thereof, which will enable others skilled in the art to make and use the same, reference being had to the accompanying drawings, forming a part of this specification, in which—

Figure 1 is an elevation of my invention. Fig. 2 is a vertical section of the same taken in the line $x\ x$. Fig. 3 is also an elevation of the same.

Similar letters of reference indicate like parts.

This invention relates to a new and improved portable device for planting or dropping corn; and it consists of a novel arrangement of parts, as hereinafter fully shown and described, whereby two rows of corn may be dropped simultaneously, and with a greater or less number of grains or kernels in a hill, as may be desired.

A A represent two seed-boxes, the front and rear sides of which extend up considerably farther than the two opposite sides, and have handles, B B, attached to them, which are connected by a cross-bar, C. The boxes A A are also connected at their front sides by a bar, D. The bars C D are attached by bolts, which pass through any of a series of holes in the bars, according to the space or distance required between the two seed-boxes. The upper parts of the sides of the boxes A A are composed of cloth, E, or any suitable flexible substance, and the tops of the seed-boxes are provided with holes, which are closed with plugs or stoppers $b$ when the machine is in use. In the lower part of each seed-box A there is a cylinder, F. These cylinders form the bottoms of the seed-boxes, and they work or turn on center points or screws $c$, which pass through the sides of the seed-boxes. The lower ends of the sides of the seed-boxes project a trifle below the cylinders F, and to the rear side of each seed-box there is fitted, in guides $d$, a rod, G. These rods are allowed to work freely in the guides, and they are connected at their upper ends to the tops of the seed-boxes by straps $e\ e$, as shown clearly in Fig. 1. The upper ends of the rods G G have straps H attached to them, which extend down around the cylinders F F, and upward at the front sides of the boxes A A, and are attached to bars I I, said bars being connected to elastic straps or springs J, which are secured to the upper ends of the seed-boxes, as shown in Fig. 3. The straps H H are attached to the cylinders F F by pins $f$. (Shown in Figs. 2 and 3.) In each cylinder F there is bored a hole, $g$. These holes extend a suitable distance into the cylinders, and they are of a suitable diameter to serve as seed-cells. Within each hole $g$ there is placed a disk, $h$, which serves as a bottom for the holes, and these disks or bottoms rest or bear upon spiral springs J. The disks $h$ have straps K attached to them, which pass through holes $i$ in the cylinders, and, extending around upon the front sides of the same, are connected thereto by set-screws J'.

From the above description it will be seen that, by adjusting the straps K, the disks $h$ may be secured farther in or out in the holes $g$, and the capacity of the latter regulated as desired. This will be fully understood by referring to Fig. 2.

L L represent what may be termed strikers, as they strike the superfluous seed from the holes $g'$ when the latter pass out from underneath the seed-boxes A A. These strikers are bars fitted in slots in the front sides of the seed-boxes and working on rods $k$. The upper ends of these strikers have spiral springs $l$ bearing against them, and their lower ends have rods $m$ passing through them to serve as stops. The outer ends of the holes $g$ are provided with metal ferrules to resist wear, and each cylinder F has a screw or pin, $u$, inserted in it to serve as a stop. (See Fig. 2.)

When the device is at rest, or not in use, the holes $g$ will be in a vertical position, in line with the centers of the interior of the seed-boxes A A, as shown in Fig. 2, the straps $e$ and springs J being adjusted to insure that result. The rods G, during this position of the cylinders F and holes or seed-cells $g$, extend down considerably below the seed-boxes A A, and, said boxes being supplied with seed, the implement is ready for use, the boxes A A being adjusted the required distance apart to suit the desired width between the rows.

The operator places the lower ends of the rods G G over or near the spots where the seed is to be dropped, and then presses down the boxes A A, which causes the cylinders F F to rotate, and the filled seed-cells $g$ pass out from underneath the seed-boxes A A, the strikers L clearing the supplemental corn from the tops of the seed-cells $g$, and without breaking or injuring the grains or kernels; for it may be understood that the strikers L yield or give, to a certain extent, on account of the springs $l$, and that the disks or bottoms $h$ of the seed-cells also yield or give. The seed passes out from the holes or seed-cells $g$ as soon as the latter are sufficiently inverted, and when the pressure is taken off the handles B B the boxes A A immediately rise under the action of the springs J, and the several parts assume their nominal position.

Straps M are attached to the bars I to prevent the corn from being thrown forward out of proper place.

The device, as a whole, is extremely simple and efficient, and may be readily adapted for dropping a greater or less number of grains or kernels in a hill, as desired.

Having thus described my invention, I claim as new and desire to secure by Letters Patent—

1. The rods G G, applied to the seed-boxes A A, in combination with the cylinders F, straps $e$ H, and springs J, all arranged to operate substantially in the manner as and for the purpose set forth.

2. The disks or bottoms $h$ in the holes or seed-cells $g$ in the cylinders F, arranged in connection with the springs J and straps K, substantially as and for the purpose specified.

3. The straps M, applied to the bars I, when used in combination with the cylinders F and rod G, substantially as and for the purpose set forth.

ROBERT M. YORKS.

Witnesses:
HUGH C. CURRY,
HENRY J. ALLEN.